3,045,341
SOLDER FOR JOINING THERMOCOUPLES WITH COPPER

Evgeny Andreevich Kolenko and Anatoly Grigorjevich Czerbina, both of Leningrad, Union of Soviet Socialist Republics
No Drawing. Filed Apr. 15, 1960, Ser. No. 23,880
1 Claim. (Cl. 29—501)

This invention relates to improvements in the process of joining thermocouples to metals.

More particularly, this invention relates to improvements in the process of joining thermocouples of bismuth-tellurium-antimony and bismuth-tellurium-selenium ternary alloys with copper plates.

The usual method of joining thermocouples of bismuth-tellurium-antimony and bismuth-tellurium-selenium ternary alloys with copper plates by means of a bismuth solder produces a considerable contact resistance at the junction due to the formation of difficulty soluble compounds in the pure bismuth.

Accordingly, it is an object of the present invention to improve the process of joining of thermocouples of such ternary alloys with copper to eliminate the disadvantages referred to in the aforegoing paragraph.

Therefore, the invention consists of effecting such joining by a soldering process and during such process applying a solder containing the following components:
98.8–99.2 percent of bismuth and 0.8–1.2 percent of tin.

The above solder is applied between the thermocouple and the plate to be joined and the resulting junction is one in which the quality of the junction between the thermocouple and plate and the quality of the solubility of the films formed during the process of soldering is improved.

The melting point of this solder is 270° C. At higher temperatures, the solder is subjected to lesser oxidation than pure bismuth.

What we claim is:

In the process of joining thermocouples of bismuth-tellurium-antimony and bismuth-tellurium-selenium ternary alloys with copper plates, the improvement comprising applying a solder containing from 98.8 to 99.2 percent bismuth and from 0.8 to 1.2 percent tin between the thermocouple and the plate to be joined to improve the quality of the junction and the solubility of the films formed during the process of soldering.

References Cited in the file of this patent

U.S. Bureau of Standards, Circular No. 382, Apr. 2, 1930, 41 pp.; pp. 6, 7 and 8 relied on.